… [11] 4,062,812
[45] Dec. 13, 1977

| | | |
|---|---|---|
| 3,959,574 | 5/1976 | Seanor et al. ............... 355/3 R |

*Primary Examiner*—Benjamin R. Padgett
*Assistant Examiner*—E. Suzanne Parr
*Attorney, Agent, or Firm*—James J. Ralabate; Ernest F. Chapman

[54] METHOD FOR EXTENDING THE FUNCTIONAL LIFE OF POLYMERS USED IN XEROGRAPHIC DEVICES

[75] Inventors: George J. Safford, Webster; James A. Lentz, Penfield, both of N.Y.

[73] Assignee: Xerox Corporation, Stamford, Conn.

[21] Appl. No.: 701,709

[22] Filed: July 1, 1976

[51] Int. Cl.$^2$ .............................................. H01B 1/00
[52] U.S. Cl. .................................... 252/500; 427/58; 428/425; 355/3 R
[58] Field of Search .................... 252/500; 355/3 TR; 260/45.9 R; 427/58; 428/425

[56] References Cited
U.S. PATENT DOCUMENTS 3,959,573  5/1976  Eddy et al. ................. 355/3 TR

[57] ABSTRACT

A method is disclosed for extending the electrical life of copolymers of butadiene and terminally unsaturated hydrocarbon nitriles by incorporating salts having asymmetrical quaternary ammonium cations or salts having structural charge specific anions therein. The method and polymers are useful for extending the functional electrical life and electrical stability of materials used in xerographic devices where control of and minimizing of the variations in the resistivity under applied voltages vs. time is important, e.g., in bias transfer rolls.

31 Claims, 3 Drawing Figures

METHOD FOR EXTENDING THE FUNCTIONAL LIFE OF POLYMERS USED IN XEROGRAPHIC DEVICES

BACKGROUND OF THE INVENTION

This invention relates to xerography and more particularly relates to a method for enhancing or controlling the functional electrical life and stability of copolymers of butadiene and terminally unsaturated hydrocarbon nitriles used in xerographic devices.

In the conventional office copier systems, many of the devices and subsystems are made of polymer materials where conductivity control and relaxation behavior (electrical) is important. These polymer materials are also generally characterized by moisture insensitivity, mechanical durability and systems stability. Exemplary of such devices and subsystems include (1) transfer belts, webs and scrolls; (2) photoconductor coatings and overlays; (3) development devices such as donor plates; and (4) durable mechanical devices with electrical stability such as, biased cleaning blades, cleaning brushes, webs or rolls, paper handling devices and static controllers in processor sorters, transport belts and the like. The poly(butadiene/terminally unsaturated hydrocarbon nitrile) copolymer compositions and methods for enhancing or controlling the functional electrical life and stability of these copolymers may be used in these devices and subsystems, and a detailed description is given herein of the utility of these compositions and methods when used to make a biasable transfer member.

In conventional xerography a photosensitive plate, which consists of a photoconductive coating placed over a conductive backing, is charged uniformly and the charge plate is then exposed to a light image of an original. Under the influence of the light image the charge on the plate is selectively dissipated to record the original input information on the plate in the form of a latent electrostatic image. The latent image is developed, or made visible, by applying oppositely charged toner particles to the plate surface in a manner so that the toner particles are attracted into the imaged areas. The developed images are generally transferred from the photoconductor to a final support material, such as paper or the like, and affixed thereto to form a permanent record of the original.

Image transfer from the photoconductor to the final support material may be accomplished by means of a corona induction using a corona generator, or it may be accomplished by a roller or belt electrode biased to a certain potential, such electrode being referred to as a bias transfer member (roll or bolt). The corotron system is relatively simple, but the charges deposited by the corotron electrostatically tack the final support material, such as paper, to the original toner support, such as, the photoconductor, in addition to creating the desired electric field affecting transfer of the toner to the paper. The strong attraction between the paper and the original toner support makes it mechanically difficult to separate or detack the two supports.

Transfer of developed images from the photoconductor to the final support material with the aid of a biased transfer member is now well known in the art, and such a member generally avoids severe tacking problems which are encountered when the corona induction system is utilized. A bias transfer roll is disclosed by Fitch in U.S. Pat. No. 2,807,233 where a metal roll coated with a resilient coating having a resistivity of about $10^6$ to $10^8$ ohm cm is used as a bias transfer member. Shelffo in U.S. Pat. No. 3,520,604 suggests that in order to create the proper environment for the duplicating mode, a transfer roll is used and is made of a conductive rubber having a resistivity in the range of from about $10^{11}$ to about $10^{16}$ ohm cm. A bias transfer member, that is, a member for electrically cooperating with a conductive support surface to attract electrically, charged particles from the support surface towards the member, is described by Dolcimascolo et al in U.S. Pat. No. 3,702,482. In Dolcimascolo et al, the bias transfer member has a conductive substrate for supporting a bias potential thereon, an intermediate blanket of, for example, polyurethane rubber, placed in contact with the substrate having an electrical resistivity capable of readily transmitting the bias potential on the substrate to the outer periphery of the blanket and a relatively thin outer coating of, for example, polyurethane, placed over the blanket having an electrical resistivity to minimize ionization of the atmosphere when the transfer member is placed in electrical cooperation with the image support surface and provides a good toner release property enabling the device to be cleaned of the toner.

Other bias transfer members are described by Eddy et al in U.S. Pat. No. 3,959,573 incorporated herein by reference where there is described and claimed biasable transfer members having a coating of a hydrophobic elastomeric polyurethane and having a resistivity in which the change in resistivity is substantially insensitive to changes in relative humidity. Exemplary of the polyurethanes therein, is a polyurethane made by reacting 83.7 percent (by weight) butadiene-acrylonitrile copolymer with 16.2 percent diisocyanate in the presence of a catalyst, the copolymer comprising about 85 percent butadiene and about 15 percent acrylonitrile. Disclosed therein is the use of ionic additives for reducing the resistivity of the hydrophobic elastomeric polyurethane. Examples of the ionic additives include quaternary ammonium compounds exemplary of which is tetraheptyl ammonium compounds. Seanor et al in U.S. Pat. No. 3,959,574, incorporated herein by reference, describe and claim biasable transfer members comprising a conductive substrate and at least one coating of an elastomeric polyurethane having an additive therein for controlling the resistivity of the polyurethane, the coating being placed over the conductive substrate. Exemplary of the additives therein which provide a method and composition for controlling the resistivity of biasable transfer members, are the quaternary ammonium compounds, exemplary of which are tetraheptyl ammonium bromide, trimethyloctadecyl ammonium chloride and benzyltrimethyl ammonium chloride.

Although the foregoing references provide polyurethane materials which have many desirable electrical and stability characteristics, it is desirable to improve the electrical life of the materials used in such devices and subsystems. It is also important to control the conductivity or electrical relaxation behavior (ionic mobility versus equilibrium rate between ionized and un-ionized salt so that new ions are provided as electrolysis depletes existing ions) of the polymers used in the foregoing devices where concurrent demands for moisture insensitivity, mechanical durability and systems stability are also important. By electrical life is meant controlled (constant) resistivity with time under an applied electrical field. The functional life of a component, such as a bias transfer roll, is directly related to maintenance of this constant controlled resistivity region. The copolymerization of butadiene and a terminally unsaturated hydrocarbon nitrile which selectively introduces nitrile groups into the polymer, greatly enhances the ionization of ionic additives, e.g., quaternary ammonium salts resulting in the need for lower salt molalities and as shown in our copending application, results in improved materials stability and solubility. However, this increases ionic mobility and therefore results in a more rapid variation in the resitivity vs. time of the material.

The functional life of the devices using the butadiene copolymerized with terminally unsaturated hydrocarbon nitriles, such as acrylonitrile, of the present invention, for example, bias transfer devices, is largely determined by the stability of the output current and or voltage versus time. Bias roll power supplies are generally constant current or constant voltage output devices with upper current or voltage limits which respond to changes in the resistivity of the bias roll material. Changes in the resistivity of the base material versus time are reflected in voltage demands required to maintain the constant current output of the material of which the device is made. In addition, it is necessary that the additive or additives used to control the V versus I (or resistivity) relationship remain soluble and uniform throughout the transfer material. If additive insolubility occurs, negative xerographic responses such as image washout, field non-uniformities and decreased environmental latitude are known to occur.

Specifically, it has been shown that a highly polar polymer network such as 15 percent acrylonitrile (ACN)/butadiene copolymer with a symmetrical quaternary additive such as tetraheptylammonium bromide (THAB) affords enhanced specified ionization of the additive and therefore improved additive efficiency. This is evidenced by the reduced additive concentration required to attain specific resistivity levels. This higher degree of ionization enables the additive to remain soluble but simultaneously results in increased ionic mobility and therefore a more rapid variation in ionic depletion and hence more rapid variation in base roll resistivity. By way of example, the butadiene homopolymer (i.e., no ACN content) requires high levels of quaternary additive (ca. 2 percent) to attain a specific resistivity due to low additive ionization. This low degree of ionization leads to solubility deficiencies of the resistivity control agents in the low polarity matrix with the resultant xerographic problems as previously described. Concurrently, however, this low polarity network results in decreased ion mobilities and hence extended functional electrical life of the material.

OBJECTS OF THE INVENTION

Accordingly, it is an object of the present invention to overcome the foregoing problems and difficulties of providing polymers having extended functional electrical life.

It is an object of this invention to improve devices and subsystems utilizing copolymers having resistivity control agents therein.

It is another object of this invention to improve and control the electrical life of butadiene copolymerized with terminally unsaturated hydrocarbon nitriles, such as butadiene/acrylonitrile copolymers, having conductivity control agents therein.

Another object of this invention is to provide a method which further decreased ion mobilities of butadiene copolymerized with terminally unsaturated hydrocarbon nitriles and hence to control the functional electrical life of the material.

Still another object of this invention is to provide a method for enhancing and controlling the electrical life of copolymers of butadiene and terminally unsaturated hydrocarbon nitrile, such as butadiene/acrylonitrile copolymers, having resistivity control agent therein without substantially altering the resistivity of the material and without increasing the ionic mobility of the copolymer.

It is also an object of this invention to provide a method for improving biasable transfer members used for electrically transferring a toner image from a photoconductive surface to a final support sheet.

Still another object of this invention is to provide a method for making biasable transfer members wherein the electrical life of the biasable members having at least one copolymer of butadiene and terminally unsaturated hydrocarbon nitrile, such as butadiene/acrylonitrile copolymer, with conductivity control agents therein is enhanced without adding amounts of conductivity control agent which would result in supersaturation of the agent in the copolymer and without increasing ionic mobility.

A further object of this invention is to provide a method of making a bias transfer roll having a resilient elastomeric layer, the electrical life of which is substantially improved without altering its resistivity or increasing its ionic mobility.

SUMMARY OF THE INVENTION

These and other objects of the invention are attained by providing a sufficient amount of at least one salt having an asymmetric cation therein or at least one salt having a structural charge specific anion therein in a copolymer of butadiene and a terminally unsaturated hydrocarbon nitrile, such as acrylonitrile. These classes of conductivity control agent incorporated in these specified copolymers, enhance the electrical life of the resultant product. Thus, a butadiene copolymer having acrylonitrile or other terminally unsaturated hydrocarbon nitrile in the copolymer composition in the presence of a salt having an asymmetric cation or a salt having a structural charge specific anion has improved functional electrical life and polymer stability. The incorporation of the specified salts in the butadiene/nitrile-containing copolymers of this invention increase anion/cation pairing which reduces ionic mobility and thereby restores the stability of the copolymer resistivity under the influence of operating potentials.

In accordance with the present invention, there is provided a method of controlling or enhancing the electrical life of copolymers of butadiene and terminally unsaturated hydrocarbon nitriles having at least one salt having asymmetric cations or at least one salt having structural charge specific anions or at least one salt having asymmetric cations and structural charge specific anions or any combination of the foregoing comprising varying or altering the concentration of the particular salt or salts or by varying the asymmetry of the salts having asymmetric cations. By varying or altering the concentration of the salt or salt is meant increasing the concentration of the salt relative to the copolymer or the final product incorporating the copolymer or decreasing the concentration of the salt relative to the copolymer or the final product. By varying the asymmetry of the salt having asymmetric cations is meant increasing or decreasing the asymmetry of any designated cation.

The effect of the increase of asymmetry of the salt or the increase of concentration of the specified salts, i.e., the salts having asymmetric cations, the salts having structural charge specific anions and the salts having both asymmetric cations and structural charge specific anions, is in increase of anion/cation pairing which reduces ionic mobility and thereby maintains or restores the resistivity of the copolymer under the influence of operating potentials. Although generally undesirable, the effect of a decrease of the respective parameters set forth above is a decrease of anion/cation pairing which increases ionic mobility and thereby results in reduced restoration of the resistivity of the copolymer under the influence of operation potentials.

Among other xerographic devices and subsystems comprising polymer materials used as coatings, substrates or as the material itself, e.g., as belts, where conductivity control and relaxation behavior (electrical) are important, our invention encompasses a method of controlling or enhancing the electrical life of biasable transfer members, that is, members capable of electrically cooperating with a conductive support surface to attract charged toner particles from the support surface towards the member, the member having at least one layer comprising an elastomer containing butadiene/nitrile copolymer, such as butadiene/acrylonitrile copolymer, having at least one solubilized salt having asymmetric cations or at least one salt having structural charge specific anions or at least one salt having asymmetric cations and structural charge specific anions or any combination thereof as resistivity control agent therein, comprising varying or altering, and preferably increasing, the concentration of the particular salt or salts or by varying or altering, and preferably increasing, the asymmetry of the salts having asymmetric cations. Basically, the biasable transfer members of the present invention having an enhanced or improved electrical life comprise a conductive substrate for supporting a uniform bias potential thereon and at least one coating comprising an elastomer comprising a butadiene copolymerized with a terminally unsaturated hydrocarbon nitrile and at least one solubilized conductivity control agent therein, the conductivity control agent being at least one of the specified classes of salts described above. Thus, there is provided a method of controlling or extending the electrical life of a biasable transfer member by coating a conductive substrate for supporting a uniform bias potential with at least one layer of an elastomer having butadiene/acrylonitrile copolymer and at least one solubilized specified salt therein, the concentration of the salt or the asymmetry of the salts having asymmetric cations being varied as desired to control electrical life or being increased to enhance or improved electrical life. In preferred embodiments, the copolymers of this invention are coated on the conductive substrate in the form of polyurethanes, polyesters and the like. Optionally, the poly(butadiene/co-acrylonitrile) having solubilized specified salts therein in accordance with the invention, may be coated with a thin outer coating of an elastomeric material to minimize ionization of the atmosphere in and about the contact region.

By the use of the term "biasable transfer member" or "bias transfer roll" is meant a member or roll for electrically cooperating with a conductive support surface to attract electrically charged particles from the support surface towards the member. More specifically, a bias transfer roll is one which electrically cooperates with a photoconductive plate when brought in contact therewith to attract charged toner particles from the plate in the direction of the roll. In this manner, the developed images are transferred from the photoconductor to a final support material, such as paper or the like.

As used herein, poly(butadiene/co-acrylonitrile), butadiene/acrylonitrile polymer, polybutadiene/polyacrylonitrile copolymer, butadiene copolymerized with acrylonitrile, or butadiene polymer having or incorporating acrylonitrile therein, are used interchangeably, and include not only those compositions wherein butadiene and acrylonitrile are formed as a copolymer but also those compositions wherein butadiene/acrylonitrile copolymers having different amounts of acrylonitrile therein are blended together. The foregoing definition also applies to the broader statement of the invention wherein the nitrile moiety of the copolymer is a terminally unsaturated hydrocarbon nitrile or a combination of such nitriles capable of copolymerization with butadiene.

Electrical life used herein refers to the functional life of the copolymer materials, e.g., butadiene and butadiene/acrylonitrile polymers, used in various electrical or biasing modes and their ability to continue in operation over a period of time. By electrical life is meant controlled constant resistivity with time under an applied electrical field. This depends in turn upon the ionization of the salt and the mobility of the ions versus the equilibrium rate between ionized and un-ionized salt such that new charge carriers are provided as electrolysis depletes the existing ions. The concentration of salts and the asymmetry of the salts having the asymmetric cations must be so adjusted to increase the polarity/solubility/specific ionization on the one hand without excessively enhancing or increasing ion mobility to the detriment of electrical life. In order to obtain the desired enhancement of electrical life in accordance with the present invention, it is critical that the butadiene/nitrile copolymers, such as butadiene/acrylonitrile copolymers, comprise the specified salts as conductivity control agents solubilized therein, the salts having asymmetric cations or structural charge specific anions or both.

For a better understanding of the invention as well as other objects and further features thereof, reference is had to the following detailed description of the invention to be read in connection with the accompanying drawings.

DESCRIPTION OF THE PREFERRED EMBODIMENTS

Figure 1:
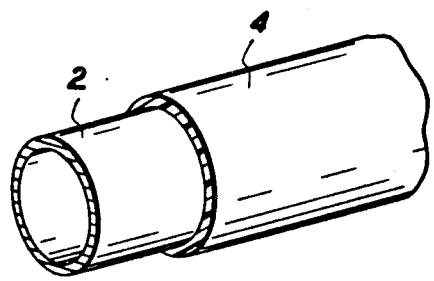
FIG. 1 is a perspective view in partial section showing the construction of a bias transfer roll having an elastomer comprising butadiene/acrylonitrile copolymer and at least one conductivity control agent therein coated upon a conductive substrate.

The butadiene/nitrile-containing copolymers of the present invention have improved electrical life when the copolymer comprises a sufficient amount of conductivity control agent in the copolymer to produce a copolymer having the desired resistivity. The conductivity control agents being limited to that class of salts having asymmetrical quaternary ammonium cations and/or structural charge specific anions. In accordance with the present invention, preferred resistivities are from about $10^7$ ohm-cm to about $5.0 \times 10^{11}$ ohm-cm and more preferably from about $10^9$ ohm-cm to about $10^{10}$ ohm-cm.

By controlling the amount of salt having asymmetrical quaternary ammonium cations and/or structural charge specific anions in the copolymers of butadiene and terminally unsaturated hydrocarbon nitrile or by controlling the amount of asymmetry in the copolymers of butadiene and terminally unsaturated hydrocarbon nitrile, there is provided a means for controlling the ionic mobility and ionization of the salts, and hence a means for controlling or extending the electrical life of the copolymer material itself while maintaining adequate solubility of the salts in the butadiene/nitrile-containing copolymer matrix. In order to accomplish this control of and improvement of electrical life, it is important that the copolymer comprise both butadiene and terminally unsaturated hydrocarbon nitrile, such as acrylonitrile, as well as at least one of the critical classes of salts. Furthermore, it is preferred in the practice of the present invenion that the copolymer comprise a sufficient amount of the nitrile moiety, to induce solubilization of the desired amount of salt, generally at least about 4 percent (based upon the weight of the copolymer), and more preferably from about 15 percent to about 60 percent. However, the upper limit of the nitrile moiety is not critical to the method of this invention as long as the desired elastomeric properties are present in the final product.

Butadiene/acrylonitrile copolymers are generally available commercially, and said copolymers are generally available with any desired amount of acrylonitrile therein. However, as described supra, it is preferred in the method of the present invention that the butadiene/acrylonitrile copolymers have about 4 percent to about 60 percent acrylonitrile and more preferably about 15 percent to about 60 acrylonitrile (by weight) in the copolymer. In preferred embodiments, the preferred copolymer having the desired acrylonitrile content are prepared in accordance with well-known commercial processes and are obtained in the form of, for exampl, liquids. The viscosity of these liquids is dependent upon the acrylonitrile content and the molecular weight. Although the molecular weight of the copolymers is not critical in the practice of the present invention, it is generally desired to have copolymers with molecular weights ranging from about 1,000 to about 5,000 or alternatively expressed having equivalent weights from about 500 grams/equivalent to about 2,500 grams/equivalent. These parameters vary for gums, resins and other forms and can be readily adjusted by one skilled in the art. The preferred copolymers of the present invention are homogeneous liquid or fluid polymers. In accordance with the present invention, the butadiene/acrylonitrile copolymers may be commercially obtained or manufactured by available commercial processes with an acrylonitrile content of about 4 percent to about 60 percent or higher acrylonitrile, the balance being butadiene. Alternatively, the desired acrylonitrile content may be obtained by mixing or blending at least two butadiene/acrylonitrile copolymers so that the blend effectively has the desired acrylonitrile content of about 4 percent to about 60 percent or higher. In preparing the polymer blends, it is important that the butadiene/acrylonitrile copolymers form a homogeneous liquid or fluid polymer blend rather than a mere suspension of the one copolymer in the other copolymer. For example, in preparing such a blend, a copolymer having an effective acrylonitrile content may be prepared by mixing or blending a butadiene/acrylonitrile copolymer having an acrylonitrile content of 20 percent with a butadiene/acrylonitrile copolymer having an acrylonitrile content of about 10 percent.

Although the preferred copolymers of the present invention are the poly (butadiene/coacrylonitriles), other copolymers may also be used where the nitrile moiety or nitrile-containing portion of the copolymer is generally a terminally unsaturated hydrocarbon nitrile capable of copolymerization with butadiene. Examples of other terminally unsaturated hydrocarbon nitriles which may be substituted throughout the specification and claims for acrylonitrile, include straight-chain and branched hydrocarbon nitriles having preferably from about 2 to about 12 carbon atoms, where the hydrocarbon portion is terminally unsaturated. More preferred nitrile moieties include propionitrile, methacrylonitrile, butyronitrile, allyl acetonitrile, dodecenylnitrile, and the like. The general chemical expression for these terminally unsaturated hydrocarbon nitriles is $R-C \equiv N$ where R is an unsaturated, straight or branched chain hydrocarbon having preferably from about 2 to about 12 carbon atoms. As used herein, the expressions of the copolymer as containing nitrile, nitrile moiety, nitrile portion, terminally unsaturated hydrocarbon nitrile and acrylonitrile are used interchangeably.

Critical in the method of the instant invention is the use of at least one conductivity control agent (the specified salts) which is soluble in the copolymer composition, and which is especially soluble in copolymer compositions having the desired nitrile content of about 4 percent to about 60 percent or higher. The conductivity control agents are mixed or blended into the homogeneous liquid or fluid copolymer solution until they are dissolved therein, it being critical that no greater amount of conductivity control agent be incorporated or mixed into the copolymer solution than will remain soluble therein or soluble in the final product. Thus, the salts having asymmetrical cations and/or structural charge specific anions are described as being solubilized in the copolymer. The solubility of the particular additive or salt, is also important in any further compositions such as further polymerized copolymer, polyurethanes, cross-linked copolymer, and other embodiments and compositions which incorporate the butadiene/nitrile-containing copolymer composition set forth herein. In all instances, it is deemed critical that the salt or salts remain solubilized in the composition. It is for this reason that it is critical to maintain a terminally unsaturated hydrocarbon nitrile, such as acrylonitrile, content in the copolymer composition of no less than about one percent so that the solubility of the conductivity control agent incorporated therein will be promoted or maintained in the copolymer. For example, although the electrical life of a copolymer composition of butadiene and acrylonitrile may be improved when the copolymer composition comprises less than about 1.0 percent acrylonitrile, such a great quantity of salt must be added to the copolymer composition to maintain suitable resistivities that the conductivity control agent becomes insoluble.

As explained supra, it is generally known in the art that by adding certain additives generally designated as conductivity control agents to certain copolymers, especially those used in the preparation of polyurethanes, the resistivity of the material can be controlled, and it is known that conductivity agents suitable for controlling the resistivity can be quaternary ammonium compounds. However, the specific additives heretofore added to the butadiene/acrylonitrile copolymers were quaternary ammonium compounds having a symmetry in the structure, that is, they were of the type where all four alkyl groups substituted on the nitrogen atom were identical, for example, tetraheptyl ammonium bromide. Furthermore, the anions of these conductivity control agents were generally anions consisting of a single atom, such as the halogens, e.g., chlorine and bromine. Such anions have a uniform charge pattern surrounding the atoms as opposed to those anions having multiple atoms which provide multiple point distribution of charge surrounding the anion. These latter anions are defined herein as structural charge specific anions.

The conductivity control agents which are incorporated in the copolymers in accordance with the present invention, for not only controlling or adjusting the resistivity but also for extending and/or controlling the electrical life of the copolymer and compositions made therefrom or therewith, are those classes of salts having asymmetrical quaternary ammonium cations and/or structural charge specific anions.

A salt having an asymmetrical cation is one wherein the cation comprises atoms or group of atoms, such as alkyl chains, asymmetrically arranged in the molecule. Typical classes of salts which may have asymmetric (asymmetrical) cations, are the organic salts, such as the quaternary ammonium compounds. In the general formula for quaternary ammonium compounds:

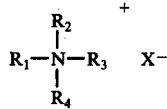

R represents alkyl groups, and $R_1$, $R_2$, $R_3$ and $R_4$ each represent an alkyl group having at least 1 carbon atom and preferably from about 1 to about 15 carbon atoms, in the form of branched chains or unbranched chains, saturated or unsaturated, and substituted or unsubstituted at least one of $R_1$, $R_2$, $R_3$, or $R_4$ must differ from the other R groups in the molecule. X may be any suitable anion including the halogens and preferably bromine or chlorine or any structural charge specific anion described below. Typical examples of the salts having asymmetrical cations are trimethyloctadecyl ammonium chloride, benzyltrimethyl ammonium chloride, didodecyldimethyl ammonium bromide, trioctylpropyl ammonium bromide, didodecyldimethyl ammonium perchlorate, and the like. In preferred salts having asymmetrical cations, at least one R group comprises a number of carbon atoms no greater than one-half the number of carbon atoms found in one of the remaining R groups. Thus, if one R group in the salt has 12 carbon atoms, then at least one R group should have no greater than 6 carbon atoms.

The control or extension of the electrical life of the copolymer can be achieved by varying the amount (concentration) of the salt in the copolymer, by varying the asymmetry of the salt, or by a combination thereof. By varying the asymmetry of the salt having asymmetric cations is meant increasing or decreasing the asymmetry of the cation. In obtaining the desired effect of promoting the restoration of the resistivity of the copolymer under the influence of operating potentials, the asymmetry of the cation in the salt is increased which increases anion/cation pairing and thereby reduces ionic mobility. Exemplary of increasing the asymmetry of the cation in organic salts, (and relative to the general formula for quaternary ammonium compounds discussed above), is the use of a salt where the cation comprises $R_1 = C_{10}$, $R_2 = C_{10}$, $R_3 = C_7$ and $R_4 = C_4$ rather that a salt where the cation comprises $R_1 = C_{10}$, $R_2 = C_{10}$, $R_3 = C_{10}$ and $R_4 = C_5$, or where $R_1 = C_{12}$, $R_2 = C_{12}$, $R_3 = C_1$, $R_4 = C_1$ rather than where $R_1 = C_8$, $R_2 = C_8$, $R_3 = C_8$, and $R_4 = C_3$. These alkyl moieties on the organic salts can be easily synthesized by one skilled in the art, as by the reaction product of the tertiary amines and alkyl halides. By varying the concentration of the salt is meant increasing (or less desirably decreasing) the concentration of the salt relative to the copolymer or the final product. Increasing the concentration of the salt having asymmetrical cations increases anion/cation pairing which reduces ionic mobility and thereby promotes restoration of the stability of the resistivity of the copolymer under the influence of operating potentials, that is, an electrical potential.

A salt having an asymmetrical charge specific anion and symmetrical cations produces the same desirable effects when used in the method of the present invention. Salts having structural charge specific anions are those wherein the anion portion comprises multiple atoms which produce distinct charge distribution points as opposed to anions comprising a single atom having uniform charge distribution around the atom. Thus, in structural charge specific anions there is a multiple point distribution of the charge in the atoms of the anion. Examples of the structural charge specific anions include perchlorate, benzoate, nitrile, nitrate, sulfate, sulfite, acetate and the like.

Typical salts having structural charge specific anions are the organic salts. Examples of these include the phosphonium salts and the ammonium salts. Examples of the ammonium salts are those having the general formula:

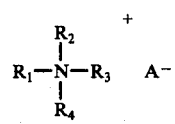

where $R_1$, $R_2$, $R_3$ and $R_4$ each represent at least one carbon atom (preferably alkyl groups), $R_1 = R_2 = R_3 = R_4$, and R may be substituted or unsubstituted, branched chain or unbranched, and saturated or unsaturated, and $A^-$ may be any structural charge specific anion, such as those described above. The control or extension (enhancement) of the electrical life of the copolymer can be achieved by varying the amount (concentration) of the salt in the copolymer.

To reduce the ionic mobility, and thereby enhance and/or control electrical stability or life, these conductivity control agents (salts) may be added in generally preferred amounts of about 0.01 percent (by weight) to about 6.0 percent (by weight) based upon the weight of the copolymer reaction product in which they are incorporated, for example, the polyurethane. The upper limit or concentration of these conductivity control agents is limited only by the solubility of the agent in the copolymer and in the copolymer reaction product and the desired resistivity of the copolymer and/or the copolymer reaction product.

As indicated supra, the useful conductivity control agents (salts) in accordance with the present invention must be solubilized in the copolymer, that is they must be soluble in the liquid or fluid copolymer and in those embodiments wherein solid compositions are formed, the conductivity control agent or agents must be solubilized in the solid composition. To determine if the conductivity control agent remains solubilized in the solid compositions, a microscopic/DSC examination of the material can be made to inspect visually for crystalline material or other types of solid conglomerations identifiable in the solid composition comprising the butadiene/acrylonitrile copolymers. Thus, in order to be effective as conductivity control (salts) for controlling the resistivity and controlling the electrical life in accordance with the method of the present invention, the salts must be soluble in the copolymer or the composition containing the copolymer. The salts may be worked into the copolymer or compositions comprising the copolymer by any suitable manner known to those skilled in the art, including incorporating a solution of the additive (salt) in a suitable solvent in the copolymer or composition comprising the copolymer or by directly mixing the salt into the homogeneous liquid or fluid copolymer. Furthermore, the salts useful in the present invention must not interfere with subsequent condensation reactions, cross-linking or other reactive modes to which the copolymer containing the solubilized salt is subjected and should not cause gellation of the copolymer or any subsequent reaction product comprising the copolymer in the effective amount incorporated therein to decrease or increase the resistivity and decrease or increase the electrical life of the butadiene/-nitrile-containing copolymer beyond the desired level.

The amount of salt generally required in the copolymers and compositions comprising the copolymers of the present invention is generally from about 0.01 percent (by weight) to about 6.0 percent (by weight) based upon the weight of the copolymer. As indicated supra, the upper limit (amount) of the salt to control resistivity and electrical life of the copolymer or composition comprising the copolymer is limited only by the solubility of the particular salt or salts in the copolymer or the composition comprising the copolymer. Thus, quantities greater than about 6.0 percent of the salt can be used in preparing the copolymers having solubilized conductivity control agents therein, but only insofar as the solubility limitations permit. Generally, amounts of salt-agent less than about 0.05 weight percent or greater than about 1.75 weight percent are not required for achieving the desired resistivity, the enhancement of electrical life, and other desired characteristics of the copolymers and compositions comprising copolymers in accordance with the present invention.

In accordance with the present invention other optional additives may also be used which will not interfere with the lift span, the resistivity, the solubilization of the conductivity control agent and the polymer polarity or ionic mobility of the compositions of the present invention. These additives include certain plasticizers, antioxidants, and the like.

The homogeneous fluid or liquid butadiene/nitrile-containing copolymers having solubilized conductivity control agents therein may be used for any application which requires conductive fluids having an extended or controlled electrical life or may be used in the preparation of solid compositions comprising the copolymer having solubilized conductivity control agents therein. Accordingly, in preferred embodiments the butadiene/acrylonitrile copolymer having conductivity control agents therein may be reacted with any suitable agent to convert the copolymer fluid or liquid having conductivity control agents therein to an elastomer, a polymeric foam material, a polymer film, and the like, or the copolymer may be cross-linked with suitable cross-linking agents, or the copolymer fluids may be further polymerized with suitable polymerization agents and processes including catalysts to form solid copolymer materials in accordance with the present invention. These embodiments are referred to herein as compositions comprising copolymers having conductivity control agents therein and more specifically may be described as compositions comprising butadiene/nitrile-containing copolymers or butadiene/acrylonitrile copolymers having conductivity control agents therein.

Among the compositions comprising butadiene/acrylonitrile copolymers having conductivity control agents therein are included those wherein the copolymer is reacted with a suitable functional material or reaction product capable of forming a solid composition having the improved electrical life characteristics. In these embodiments, the conductivity control agent concentration must be sufficient not only to produce a reaction product having a resistivity at the desired level and preferably within the range of about $10^7$ to about $5.0 \times 10^{11}$ ohm-cm, but also to produce a reaction product having enhanced electrical life. When the butadiene/acrylonitrile copolymer having conductivity control agent therein is reacted with a suitable functional agent or reacting material capable of forming a product having improved electrical life, there is formed a reaction product of the butadiene/acrylonitrile copolymer having conductivity control agent therein with the functional agent.

Examples of reaction products which may be formed in accordance with the present invention, include the reaction product of the copolymers of this invention and a diisocyanate to form a polyurethane having improved electrical life; the reaction product of the copolymer with a dibasic acid to form an elastomeric ester having improved electrical life; the reaction product of the copolymer with a difunctional epoxy to form an epoxy product having improved electrical life; the reaction of the copolymer with suitable cross-linking agents well known in the art to form the cross-linked copolymer having improved electrical life; and the further polymerization of the fluid or homogeneous liquid copolymer in the presence of suitable polymerization agents including catalysts wellknown in the art to form a copolymer product having improved electrical life; all of the foregoing products having conductivity control agents therein within the designated amounts, and all of the reaction products comprising the butadiene/nitrile-containing copolymers having terminally unsaturated hydrocarbon nitrile.

Typical of the process for preparing the foregoing reaction products is the reaction of the diol of the acrylonitrile-butadiene copolymers of the present invention having conductivity control agents therein with di-or tri-functional acids, for example, dibasic acids such as adipic acid, azelic acid, sebacic acid and the like, to form elastomeric esters; with isocyanate, for example, the aromatic or aliphatic diisocyanates, to form polyurethanes; with difunctional epoxys to form epoxy reaction products; and the like. Other conductive elastomers, films, foams and the like having improved electrical life, may also be prepared by cross-linking the butadiene/acrylonitrile copolymers having conductivity control agents therein by typical sulfur vulcanization techniques well known in the art or by further polymerization of the copolymers themselves utilizing typical free radical catalyst polymerization techniques and catalysts well-known in the art.

The polycondensation-type reactions leading to the formation of the elastomeric polyurethanes which have improved electrical life in accordance with the present invention, are influenced by a number of factors, prominent among which are the structure of the isocyanate, including its functionality and the type and location of substituents; the structure of the polyhydroxy compounds; the solvent used in the dilution of the system; the presence of impurities; and the temperature, particularly above about 100° C. One skilled in the art can adjust these parameters to prepare suitable elastomeric polyurethanes having the abovedescribed properties for the embodiments useful in the present invention.

The formula for a typical butadiene/acrylonitrile copolymer is shown below:

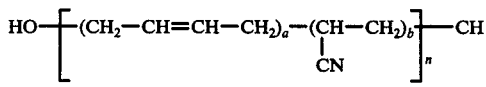

where $a$ is greater than 0.85 but not greater than about 0.99 and $b$ is less than 0.15 but not less than 0.01, and $n$ is about 78–87. In more preferred embodiments, $b$ is about 0.02 to about 0.08 and $a$ is about 0.98 to about 0.92.

When the foregoing hydroxy terminated butadiene/acrylonitrile copolymer having conductivity control agent therein is reacted with a diisocyanate, a polyurethane product having conductivity control agent therein and having improved electrical life in accordance with the present invention is produced.

The general formula for a diisocyanate is:

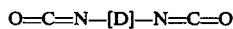

where D is a 36-carbon hydrocarbon radical. A typical diisocyanate prepared from linoleic acid in a Diels Aldertype reaction, the product of which is hydrogenated, would form the following typical diisocyanate formula:

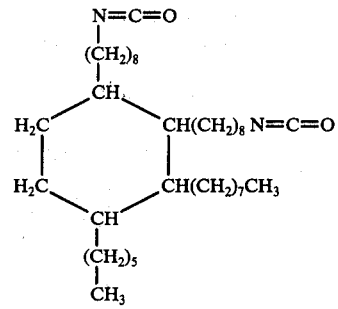

The foregoing chemical formula and reactions are set forth and described in U.S. Pat. No. 3,959,573.

The foregoing copolymers and compositions comprising the copolymers having the conductivity control agents therein have utility in various devices and mechanisms, especially those where belts, coatings, membranes, rolls, and the like require materials having controlled conductivity or where relaxation (electrical) behavior is important and where concurrent demands are made for moisture insensitivity, mechanical durability and systems stability. Special utility is found in the application of the copolymers and compositions comprising the copolymers of the instant invention as biasable transfer members used in xerographic devices and systems. Other areas of utility include (1) transfer belts, webs and scrolls; (2) photoconductor coatings or overlays; (3) development devices such as donor plates used in xerography; and (4) durable mechanical devices with electrical stability requirements such as biased cleaning blades, cleaning brushes, webs or rolls, paper handling devices and static control in processor sorters, transport belts and the like.

Exemplary of the utility of these materials are the biasable transfer members described in the patents incorporated herein by reference by previous designation.

Referring now specifically to FIG. 1, there is shown a cut-away view of a transfer member clearly illustrating the internal construction thereof. The transfer member is in the form of a roll and is basically formed upon a rigid hollow cylinder 2 that is fabricated of a conductive metal, such as aluminum, copper or the like, capable of readily responding to a biasing potential placed thereon. Over core 2 is placed a coating 4 which is the elastomeric polyurethane comprising the butadiene/acrylonitrile copolymer having conductivity control agent therein of the present invention. Outer coating 4 which is formed of a resilient elastomeric material is preferably about 0.25 inch in thickness having a hardness between about 40 Shore 00 and about 40 Shore A and preferably about 10–25 durometers. Where coating 4 minimizes ionization of the atmosphere in and about the contact region of the bias transfer member with the photoconductor; where it has suitable mechanical stability; and where it is easy to clean, the elastomeric polyurethane may be outermost coating on the bias transfer member. It is preferred that the resilient elastomeric polyurethane comprising butadiene/acrylonitrile copolymer having conductivity control agent therein, having a resistivity of between about $10^7$ and $5.0 \times 10^{11}$ ohm-cm. In accordance with the present invention, the coating of the conductive substrate must be formulated of at least one layer of the specified elastomeric polyurethanes. By coating the biasable transfer member (roll) with this particular class of polyurethanes comprising butadiene/acrylonitrile copolymers, the resistivity of the biasable transfer roll is controlled and the electrical life of the roll is improved or controlled. Generally, resistivity of the roll also remains substantially unchanged when changes in relative humidity occur. Thus, the elastomeric polyurethanes comprising the butadiene/nitrile-containing copolymers of this invention such as the butadiene/acrylonitrile copolymers, used as the outer coating of the bias transfer member of FIG. 1 have substantially improved electrical life.

Figure 2:
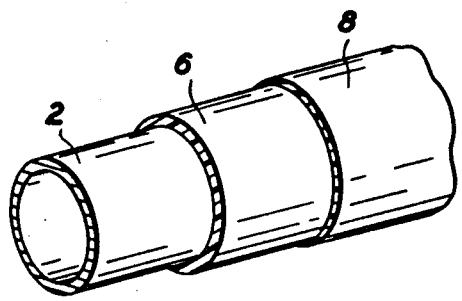
FIG. 2 is a perspective view in partial section showing the construction of a bias transfer roll having an elastomer comprising butadiene/acrylonitrile copolymer and at least one conductivity control agent therein as a resilient blanket or relaxable layer intermediate the conductive substrate and a relatively thin outer coating.

Referring now to FIG. 2, wherein there is shown a cutaway view of a biasable transfer roll and a clear illustration of the internal construction thereof, there is shown a rigid hollow cylinder 2 that is fabricated of a conductive metal, as in FIG. 1, capable of readily responding to a biasing potential placed thereon. Over the rigid hollow cylinder 2 is placed a relatively thick resilient intermediate blanket 6 of the elastomeric polyurethane material comprising butadiene/acrylonitrile copolymer having a hardness of between about 40 Shore 00 and about 40 Shore A. The elastomeric polyurethane may be about 0.125 inch to about 0.625 inch in thickness and is preferably 0.25 inch in thickness, having sufficient resiliency to allow the roll to deform when brought into moving contact with the photoconductive drum surface to provide an extended contact region in which the toner particles can be transferred between the contact bodies. Intermediate blanket 6, which is comparable to layer 4 in FIG. 1, should be capable of responding rapidly to the biasing potential to impart electrically the charge potential on the core to the outer extremities of the roll surface and should have improved electrical life. The blanket, therefore, should have a resistivity of between about $10^7$ and $5.0 \times 10^{11}$ ohm-cm, and preferably about $10^9$ to about $10^{10}$ ohm-cm. Over the intermediate blanket is placed a relatively thin outer coating 8 which according to the prior art bias transfer rolls, may be an elastomeric material such as a polyurethane having a resistivity of between $10^{10}$ and $10^{15}$ ohm-cm and which preferably has a thickness of about 0.0025 inch and a hardness of about 65-75 D durometer. Ionization of the atmosphere in and about the contact region is minimized in accordance with the discussion set forth above relating to the resistivity of the outer coating.

The outer layer 8, known also as a self-leveling layer, is a leaky insulator, and is generally selected for its higher resistive values than those of resilient blanket (relaxable layer) 6. In addition, outer layer 8 includes materials, or is so related to relaxable layer 6, such that charges applied to the outer surface of layer 8 will be generally dissipated within one revolution of the roll. Layer 8 also acts as a thin insulating layer to help protect resilient blanket 6 during air breakdown, to limit current flow through the roll, and to make the roll surface easy to clean. When the relaxable material, i.e., the resilient, elastomeric polyurethane comprising butadiene/acrylonitrile copolymer of this invention, is durable and cleanable, layer 8 is not required and the roll of FIG. 1 may be used as a biasable transfer member. Furthermore, in accordance with the present invention, relative humidity problems are generally reduced or eliminated, and outer layer 8 need not act as a moisture barrier to prevent resistivity changes in resilient blanket 6 due to changes in relative humidity. Thus, when the biasable transfer members of this invention are coated with at least one layer of the elastomeric polyurethane comprising butadiene/nitrile-containing compositions of this invention, such as butadiene/acrylonitrile compositions, the resistivity thereof can be controlled and the electrical life is increased or enhanced.

The hardness of the elastomeric polyurethanes and other compositions of the present invention is not critical but in the case of biasable transfer members it is recommended that such compositions have a hardness between about 40 Shore 00 to about 40 Shore A, and preferably about 10-25 Shore A. The control of the hardness is within the purview of those skilled in the art, and the hardness can be controlled by such parameters as by varying the NCO/OH ratio, by varying the type of reactants utilized, and by using various additives such as plasticizers.

In accordance with the present invention, there is described a method of controlling, improving, and/or enhancing the electrical life of a biasable transfer member having at least one coating of an elastomeric reaction product of a butadiene/nitrile-containing copolymer and a diisocyanate upon a conductive substrate for supporting a uniform bias potential therein by adjusting the concentration of the specified classes of salt or by altering the asymmetry of cations in salts having asymmetric cations; dissolving the salt or salts in the copolymer; reacting the copolymer having the salts solubilized therein with the diisocyanate to produce a polyurethane; and coating the polyurethane on the conductive substrate.

The following specific examples illustrate more clearly the method of enhancing electrical life and the copolymers and compositions comprising butadiene/acrylonitrile copolymers of the instant invention which may be used in preparing the biasable transfer members and for controlling the electrical life of biasable transfer members, although the invention is not to be construed as limited in its scope thereby.

EXAMPLE I

Slabs of polyurethane were prepared by reacting 83.7 percent (by weight) butadiene/acrylonitrile copolymer, supplied by Arco Chemical Company, under the tradename Arco CN-15, with 16.2 percent diisocyanate, supplied by General Mills under the trade designation DDI 1410, in the presence of 0.1 percent conventional catalyst supplied by Argus Chemical under the trade designation Catalyst Ul-19. The copolymer comprised about 85 percent (by weight) butadiene and about 15 percent (by weight) acrylonitrile. The copolymers had hydroxy values in meq. per gm. of about 0.60 and a viscosity at 30° C of about 525 poise. The hardness of the reaction products were about 29 Shore A.

Prior to the formation of the foregoing polyurethanes, various organic salts having asymmetric cations were added to the homogeneous liquid copolymer having the designated acrylonitrile content therein in the quantities shown in Table 1 below. The concentrations of the salts are shown in weight percent based on the weight of the polyurethane. As seen in Table I, generally the resistivity for the final polyurethane material was about $3 \times 10^9$ ohm-cm. The resistivities were measured by conventional techniques known to those skilled in the art and are shown in ohm-cm. The organic salts (quaternary ammonium compounds having asymmetric cations) were added to the liquid copolymer until solution was complete by stirring the salt into the copolymer solution. The salts shown in Table I were soluble in the designated copolymer solutions at the deisgnated concentrations.

The effect of the increased concentration and increased asymmetry of the cation of the salt is shown in Table I below where $I_o/2$ is the measure of the time for the initial current under a constant voltage stress or potential to decay 50 percent of its original value. $I_o$ is the initial current and $I_o/2$ is essentially a half-life decay designation.

In Table I, the cation and anion designations refer to the salt. All salts in the Table are quaternary ammonium salts, and sample No. 1 is tetraheptyl ammonium bromide; sample No. 2 is trioctylpropyl ammonium bromide; sample No. 3 is ethylhexadecyldimethyl ammonium bromide; and sample No. 4 is didodecyldimethyl ammonium bromide.

TABLE I
INFLUENCE OF CATION ASYMMETRY ON CURRENT vs. TIME PROFILE

| Sample No. | Cation | Anion | Structure | Conc. % (by weight) | Resistivity (ohm-cm) | $I_o/2$ (minutes) |
|---|---|---|---|---|---|---|
| 1 | (Hep)$_4$ | Br$^-$ | (C$_7$H$_{15}$)$_4$N+Br$^-$ | .07 | 3 × 10$^9$ | 20 |
| 2 | (Ot)$_3$Pr | Br$^-$ | (C$_8$H$_{17}$)$_3$PrN+Br$^-$ | .35 | 9 × 10$^8$ | 32 |
| 3 | EtHDMe$_2$ | Br$^-$ | (C$_{16}$H$_{33}$)EtMe$_2$N+Br$^-$ | .35 | 2 × 10$^9$ | 70 |
| 4 | (DD)$_2$Me$_2$ | Br$^-$ | (C$_{12}$H$_{25}$)$_2$N+(Me$_2$)Br$^-$ | .36 | 3 × 10$^9$ | 105 |

Figure 3:
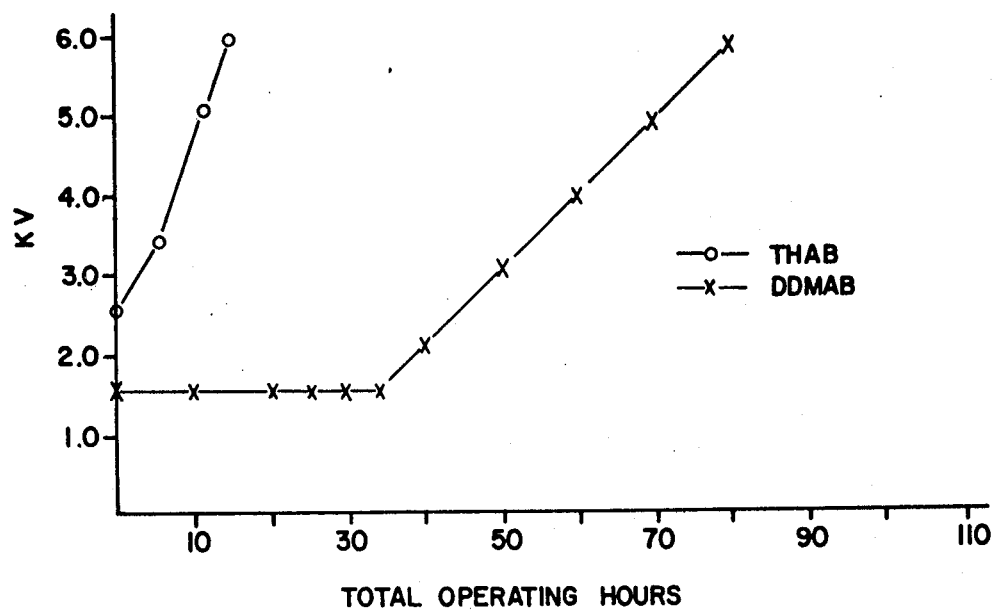
FIG. 3 is a graph showing the effect of cation symmetry on the electrical life of copolymers made by the method of the present invention.

The effect of cation symmetry in the salt is shown graphically in FIG. 3 where the number of operating hours versus the voltage until failure of two polyurethanes prepared as above, is shown. A polyurethane with quaternary ammonium salt having a symmetrical cation as additive is represented by the circles (o) in the graph, and the salt was tetraheptyl ammonium bromide (THAB). A polyurethane with quaternary ammonium salt having an asymmetrical cation as additive is represented by the line interrupted with x's, and the salt was didodecyldimethyl ammonium bromide (DDMAB). The resistivity of both polyurethanes used for the graphical representation was 3 × 10$^9$ ohm-cm.

Failure in this instance is chosen as 6.0 kilivolts (KV). Standard techniques well known in the art are used to measure the voltage.

Table I demonstrates that as asymmetry increases in the cation portion of the salts used in the present invention, there is an increase in the ability of the material (polyurethane) to restore the stability of the resistivity under the influence of operating potentials when the polyurethane is used on a bias transfer member. The graph also reflects this improvement.

EXAMPLE II

A series of polyurethane slabs are prepared as in Example I having varying concentrations of tetraheptyl ammonium bromide (THAB) therein. Concentrations of the THAB ranged from 0.07 percent to 0.36 percent (based upon the weight of the polyurethane), and although the resistivity changes with varying amounts of THAB, there is little variation in $I_o/2$. Thus, increased concentrations of salts having symmetrical cations in the polyurethane do not increase or enhance the life of the polymer.

EXAMPLE III

A series of polyurethane slabs were prepared as in Example I having varying concentrations of tetraheptyl ammonium perchlorate. As the concentration of the tetrabutyl ammonium perchlorate increases in the butadiene/acrylonitrile copolymer, the $I_o/2$ (time for the initial current under a constant voltage stress or potential to decay to 50 percent (one-half) of its original value) increased, demonstrating a greater ability of restoring stability of the resistivity under the influence of operating potentials.

The objects of the present invention have been amply demonstrated by the above examples. Elastomeric polyurethanes comprising butadiene/acrylonitrile copolymers having salts with increasing asymmetry in the cations, salts with asymmetrical cations of increasing concentration and salts with structural charge specific anions of increasing concentration show substantially improved electrical life (roll life) while maintaining solubility of the salt in the copolymer products. It has also been shown by the foregoing examples that control of the salt content in acrylonitrile/butadiene copolymers provides a means for controlling the ionic mobility and ionization of the salts and hence extends the electrical life of transfer devices while maintaining adequate solubility for the salts in the butadiene/acrylonitrile matrix.

EXAMPLE IV

A series of polyurethane slabs were prepared as in Example I having varying concentrations of didodecyldimethyl ammonium bromide therein as shown in Table II below. Concentrations of the salt ranged from 0.07 percent to 1.5 percent (based upon the weight of the polyurethane). The resistivity and $I_o/2$ were measured as in Example I. The applied voltage was 10 volts/mil for each sample.

TABLE II
INFLUENCE OF CONCENTRATION OF ASYMMETRIC CATION ON CURRENT vs. TIME PROFILE

| Sample No. | Conc. (% by weight) | Resistivity (ohm-cm) | $I_o/2$ (minutes) |
|---|---|---|---|
| 1 | 0.07 | 7 × 10$^9$ | 44 |
| 2 | 0.1 | 5 × 10$^9$ | 75 |
| 3 | 0.36 | 2.5 × 10$^9$ | 105 |
| 4 | 1.5 | 8 × 10$^8$ | 145 |

Table II demonstrates that as the concentration of the salt having asymmetric cations increases, there is a corresponding decrease in resistivity (increased conductivity) and an increase in electrical life, i.e., an increase in the ability of the polyurethane to restore the stability of the resistivity under the influence of operating potentials when the polyurethane is coated upon a conductive core and used as a bias transfer member.

While this invention has been disclosed with reference to the structure and compositions disclosed herein it is not necessarily confined to the details as set forth and this application is intended to cover such modifications or changes as may come within the scope of the following claims.

What is claimed is:

1. A method for controlling the electrical life of copolymers of butadiene and terminally unsaturated hydrocarbon nitrile comprising incorporating varying concentrations of at least one salt selected from the group of phosphonium salts and quaternary ammonium salts, said salt having an asymmetrical cation in the copolymer.

2. A method in accordance with claim 1 wherein the terminally unsaturated hydrocarbon nitrile is acrylonitrile.

3. The method of claim 1 wherein the salt having an asymmetrical cation is didodecyldimethyl quaternary ammonium bromide.

4. A method in accordance with claim 1 wherein the concentration of salt having an asymmetrical cation varies from about 0.01 percent by weight to about 6.0 percent by weight based upon the weight of the copolymer.

5. The method of claim 1 wherein the electrical life of the copolymer is increased by increasing the concentration of the salt having an asymmetrical cation in the copolymer.

6. A method of controlling the electrical life of copolymers of butadiene and terminally unsaturated hydrocarbon nitrile comprising incorporating at least one salt selected from the group consisting of phosphonium and quaternary ammonium salts, said salt having an asymmetrical cation in the copolymer and varying the asymmetry of the cation.

7. A method in accordance with claim 6 wherein the terminally unsaturated hydrocarbon nitrile is acrylonitrile.

8. The method of claim 6 wherein the salt having varying asymmetrical cation is didodecyldimethyl quaternary ammonium bromide.

9. The method of claim 6 wherein the electrical life of the copolymer of butadiene and terminally unsaturated hydrocarbon nitrile is increased by increasing the asymmetry of the cation in the salt having an asymmetrical cation.

10. A method for controlling the electrical life of copolymers of butadiene and terminally unsaturated hydrocarbon nitrile comprising incorporating varying concentrations of at least one salt selected from the group consisting of phosphonium salts and quaternary ammonium salts, said salt having a structural charge specific anion in the copolymer.

11. A method in accordance with claim 10 wherein the terminally unsaturated hydrocarbon nitrile is acrylonitrile.

12. A method in accordance with claim 10 wherein the structural charge specific anion is selected from the group consisting of perchlorate, nitrile, nitrite, sulfate, sulfite, benzoate, and acetate.

13. The method of claim 10 wherein the salt has a symmetrical cation.

14. The method of claim 10 wherein the salt has an asymmetrical cation.

15. The method of claim 10 wherein the electrical life of the copolymer of butadiene and terminally unsaturated hydrocarbon nitrile are increased by increasing the concentration of the salt having a structural charge specific anion in the copolymer.

16. The method of claim 15 further comprising reacting the copolymer having improved electrical life with a diisocyanate to form a polyurethane having improved electrical life.

17. The method of claim 15 further comprising reacting the copolymers having improved electrical life with a dibasic acid to form an elastomeric ester having improved electrical life.

18. The method of claim 15 further comprising reacting the copolymer having improved electrical life with an epoxy functional material to form an epoxy reaction product having improved electrical life.

19. A method of increasing the electrical life of a biasable transfer member having at least one coating of an elastomeric material, the elastomeric material being the reaction product of a butadiene/nitrile-containing copolymer and a suitable functional agent selected from the group consisting of a diisocyanate, a dibasic acid and a functional epoxy, upon a conductive substrate for supporting a uniform bias potential thereon, comprising incorporating varying concentrations of a salt selected from the group consisting of phosphonium salts and quaternary ammonium salts, said salt having an asymmetrical cation in the copolymer; dissolving the salt having asymmetrical cation in the copolymer; reacting the copolymer having the salt having asymmetrical cation therein with the suitable functional agent to produce a reaction product containing the solubilized salt having asymmetrical cation; and coating the reaction product having the solubilized salt having asymmetrical cation therein on the conductive substrate, the diisocyanate reaction product being a polyurethane, the dibasic acid reaction product being an elastomeric ester, and the difunctional epoxy reaction product being an epoxy reaction product.

20. The method of claim 19 wherein the nitrile containing portion of the copolymer is acrylonitrile.

21. The method of claim 19 wherein the amount of salt having asymmetrical cation is increased from about 0.01 weight percent up to that amount of salt which can be solubilized in the reaction product.

22. The method of claim 19 wherein the salt having an asymmetrical cation in the copolymer is didodecyldimethyl quaternary ammonium bromide.

23. The method of claim 19 wherein the electrical life of the reaction product is increased by incorporating increasing concentrations of the salt having an asymmetrical cation in the copolymer.

24. A method of increasing the electrical life of a biasable transfer member having at least one coating of an elastomeric material, the elastomeric material being the reaction product of a butadiene/nitrile-containing copolymer and a suitable functional agent selected from the group consisting of a diisocyanate, a dibasic acid and a difunctional epoxy, upon a conductive substrate for supporting a uniform bias potential thereon, comprising incorporating salts selected from the group consisting of phosphonium salts and quaternary ammonium salts, said salt having asymmetrical cations in the copolymer, the salts having varying cation asymmetry; dissolving the salt having the varying asymmetrical cation in the copolymer; reacting the copolymer having the salt having asymmetrical cation therein with the suitable functional agent to produce a reaction product containing the solubilized salt having asymmetrical cation therein on the conductive substrate, the diisocyanate reaction product being a polyurethane, the dibasic acid reaction product being an elastomeric ester, and the difunctional epoxy reaction product being an epoxy reaction product.

25. The method of claim 24 wherein the nitrile-containing portion of the copolymer is acrylonitrile.

26. The method of claim 24 wherein the electrical life of the reaction product is increased by incorporating salts having increasing asymmetry in the cation in the copolymer.

27. A method of increasing the electrical life of a biasable transfer member having at least one coating of an elastomeric material, the elastomeric material being the reaction product of a butadiene/nitrile-containing copolymer and a suitable functional agent selected from the group consisting of a diisocyanate, a dibasic acid and a difunctional epoxy, upon a conductive substrate for supporting a uniform bias potential thereon, comprising incorporating varying concentrations of a salt selected from the group consisting of phosphonium salts and quaternary ammonium salts, said salt having a structural charge specific anion in the copolymer; dissolving the salt having structural charge specific anion in the copolymer; reacting the copolymer having the salt having structural specific anion therein with the suitable functional agent to produce a reaction product containing the solubilized salt having structural charge specific anion therein on the conductive substrate, the diisocyanate reaction product being a polyurethane, the dibasic acid reaction product being an elastomeric ester, and the difunctional epoxy reaction product being an epoxy reaction product.

28. The method of claim 27 wherein the nitrile-containing portion of the copolymer is acrylonitrile.

29. The method of claim 27 wherein the amount of salt having structural charge specific anion is increased from about 0.01 weight percent up to that amount of salt which can be solubilized in the reaction product.

30. The method of claim 27 wherein the structural charge specific anion is selected from the group consisting of perchlorate, nitrile, nitrite, sulfate, sulfite, benzoate, and acetate.

31. The method of claim 27 wherein the electrical life of the reaction product is increased by incorporating increasing concentrations of salt having a structural charge specific anion in the copolymer.

* * * * *